United States Patent Office 3,450,582
Patented June 17, 1969

3,450,582
AQUEOUS AMMONIUM NITRATE BLASTING COMPOSITION CONTAINING SOLID CARBONACEOUS FUEL AND METHOD OF PREPARING SAME
Harold W. Sheeran, E. 917 20th, Spokane, Wash. 99203, and Marcel H. Oriard, Box 33, Marshall, Wash. 99020
No Drawing. Filed Dec. 18, 1967, Ser. No. 691,188
Int. Cl. C06b 1/04, 19/00
U.S. Cl. 149—2                                19 Claims

ABSTRACT OF THE DISCLOSURE

A blasting agent utilizing ammonium nitrate fuel and water to form a desired plasticity. The compound is detonatable because it employs fuel which is water stable either chemically of physically or both and remains in intimate association with the ammonium nitrate in the presence of water whether in the solid phase or liquid phase. The total oxygen balance of AN and fuel is adjusted by the formula proportions to be within detonatable limits.

Also, the method for making the blasting agent which comprises utilizing heat to liquify a normally solid fuel while mixing with porous prilled ammonium nitrate to effect adsorption and absorption of the fuel by the ammonium nitrate, thus effecting said intimate association in the solid phase and liberating only that portion of fuel into the liquid phase which corresponds to the quantity of ammonium nitrate which is dissolved by the added water.

---

Our present invention relates to blasting agents and more particularly to plastic blasting agents which contain a water stable non-explosive sensitizing agent or fuel in ratio to ammonium nitrate in a detonatable approximate oxygen balance in the simultaneously occuring liquid and solid phases when mixed with water to provide a fluid mass.

| | |
|---|---|
| AN | Ammonium nitrate. |
| CN | Calcium nitrate. |
| SN | Sodium nitrate. |
| U | Urea. |
| p-NT | Para-nitrotoluene. |
| m-NT | Meta-nitrotoluene. |
| PW | Paraffin wax. |
| SP | Solid phase. |
| LP | Liquid phase. |
| DFO | Diesel fuel oil. |
| EG | Ethylene glycol. |
| c-OP | WR flour. |
| WR | Water resistant. |
| EVA | Ethylene-vinylacetate copolymer. |
| VOD | Velocity of detonation. |
| AS | Aluminum stearate. |

It has long been known that ammonium nitrate/fuel oil blasting agents decrease in efficiency of detonation with each added increment of water. Heretofore, when the weight ratio of water to blasting agent reached 10%, it was found that it could not be detonated at all.

Our research has indicated to us that with the addition of water to the conventional fuel oil mixed with ammonium nitrate (AN), quantities of the fuel oil leeched out and was replaced by water sufficiently so that the fuel oil was no longer in intimate contact with the undissolved ammonium nitrate which remained in the water. The dissolved AN tends to form a saturated AN solution while the fuel oil released thereby forms droplets which segregate and tend to float to the top. It is theorized that this lack of intimate contact of the ammonium nitrate with its fuel, along with the cooling effect of vaporization of the water, were the probable causes of the decrease in efficiency of detonation as hereinbefore stated.

Our subsequent experimentation appears to support the probability of the foregoing theory, since by changing the characteristic fuel normally employed in such ammonium nitrate/hydro-carbon blasting agents, to those having physical characteristics of being stable in water and also capable of maintaining intimate contact with the AN component, we have been able to achieve predictable detonations of compositions comprising: ammonium nitrate-water stable fuel-water. A water stable fuel must be used. That is, the fuel portion that remains in the solid phase (SP) must retain its chemical characteristics and its physical contact with the undissolved ammonium nitrate (AN) while its liquid phase (LP) is characterized by a sufficient quantity of AN being dissolved into the water to form a saturated solution and thereby release a corresponding portion of water stable fuel as a finely divided insoluble solid in suspension and thus intimately related to the AN saturated solution. The intimate association of the water stable fuel and the AN in both of its phases must not be adversely affected by the addition of water and consequent dissolution of a portion of the AN component and the coincident suspension in the solution of the water stable fuel component physically released by the AN solute.

While it is not absolutely necessary for detonation, substantial oxygen balance greatly improves the detonation characteristic and should be maintained in the compositions similarly to that which is found in dry ammonium nitrate/fuel oil compositions. Also, for maxium velocity of detonation, the solid phase (SP) and liquid phase (LP) must be substantially oxygen balanced both with respect to themselves and the overall composition.

Furthermore, for optimum results, the density of the composition should be maintained below approximately 1.4 grams per cubic centimeter in formulations not containing heavier metal nitrates and preferably within a range of between 1.2 and 1.35 grams per cubic centimeter.

The ammonium nitrate component most satisfactorily utilized may consist of any of the commercially available prills of the "porous" variety, but preferably those having a minimum amount of inert filler or coating. However, other varieties of commercial particulate ammonium nitrate; that is, agricultural prills, grained, crystalline and flake particles, will also function in these compositions with suitable adjustment of formulations to maintain the desired AN fuel intimacy and substantiall oxygen balance.

The aforementioned ammonium nitrate is mixed with a melted or otherwise liquified stable fuel, which may be solid organic compounds such as waxes or solid nitroaromatic compounds as paranitrotoluene. When liquid fuel compounds are used, they must be water stabilized. This is accomplished by mixing them with an ethylenevinylacetate copolymer or other suitable plastic which is soluble in the heated fuel, forming a fluid mixture while hot and a stable gel upon cooling. Gelling agents such as aluminum stearates and palmates for liquid hydrocarbon stabilize liquid fuels with respect to water.

When a predetermined quantity of water is incorporated with this mixture, the composition is possessed of a simultaneous solid phase (SP) and also a liquid phase (LP). In the liquid phase (LP) a portion of the ammonium nitrate is dissolved to form a saturated solution and during agitation a portion of the said fuel is released as a finely divided insoluble fuel in suspension in the solution and intimately associated with the ammonium nitrate solute. In the LP, water missible organic liquids such as the polyhydric alcohols, oil in water emulsions and suitable water soluble organic compounds can also be used as fuels to good advantage. Gelling agents and metalizing components must also be considered part of the fuel in the LP for calculating the oxygen balance.

Plastic blasting agents of the type herein described have many advantages over the various known slurry explosives and water resistant explosives currently in use.

(1) They are safer to manufacture and use because they do not require a high explosive or metallic sensitizing agent.

(2) They are very economical in that they contain about 18% or less of a variety of inexpensive non-explosive fuels which, in effect, take the place of 20% or 30% and more of expensive metallic or explosive sensitizers required in slurries and water-resistant explosives now available.

(3) They have water resistance characteristics equal to other known commercial water-resistant explosives and slurry explosives.

(4) They are relatively easy to formulate and manufacture from easily available raw materials.

(5) They can function over a very wide range of water contents from 3.17% to 33.3% with only minor formula variations.

(6) The volocity is predictabel and can be varied over a wide range by formula adjustments.

The highest velocity formulations shoot at the velocity of AN-FO and therefore offer a lower velocity range than do present day commercial slurry explosives.

The method of mixing the compositions is very important due to the mutual balance that must be maintained between the oxygen balance of the SP and LP. An effective and simple method is to heat the ammonium nitrate to a temperature above the melting point of the normally solid stable fuel with which it is to be mixed and which has been preheated also to a temperature above said melting point. Fuels such as paraffin wax and para-nitrotoluene are very fluid since they are melted, and are absorbed into and adsorbed onto the prills as effectively as is fuel oil with room temperature prills and therefore are in intimate association, as the term and its analogues are employed in the appended claims. However, upon cooling below said melting point, the paraffin wax, para-nitrotoluenes and other normally solid fuels described, become solid and thereafter are physically stable and are locked into the structure of the prills, that is, when the solid phase is mixed with the saturated solution LP, the physically locked fuel cannot migrate in the saturated solution with respect to its prill and therefore retain its intimate contact with the AN of the solid phase indefinitely. Mixing of the ammonium nitrate prills and fuels is continued while the mixture cools to a temperature below the melting point and at which the majority of the particles do not fuse. A water thickening material which we term a water resistant (WR) flour may then be added and thoroughly mixed in. When this mixture lowers to a temperature of about 90° to 95°, it is added to the water component at about 120° F., and mixed for about another 10 minutes or for sufficient time to obtain substantial uniformity throughout. If the amount of normally solid water stable fuel used is uniformly distributed and in such a proportion to the ammonium nitrate as to produce a detonatable oxygen balance in the overall formulation prior to adding it to the water, the amount of ammonium nitrate liberated by its dissolving in the water, will automatically produce a detonatable oxygen balance in both the SP and LP. Where a saturated AN-water solution is employed, care must be taken to provide substantial oxygen balance in the LP separately, either by premixing as described the solid fuel and ammonium nitrate of the LP to substantial oxygen balance before dissolving the ammonium nitrate or by adding a water miscible fuel such as ethylene glycol in amounts required for substantial oxygen balance of the LP.

Gelled fuels such as ortho or meta-nitrotoluene/ethylene-vinylacetate copolymer (m-NT/EVA), and aluminum stearate/diesel fuel oil (AS/DFO) also function as effective stable fuels. However, they may require longer heating periods to permeate the prills sufficiently to effect intimate association with the AN, as in the case of the more viscous m-NT/EVA, or may require heating after the gelling agent is added as in the case of AS/DFO.

We have found that water miscible organic liquids, oil and water emulsions and water soluble oxygen deficient organic compounds also fulfill the requirements of being chemically unchanged in solution and maintained the required intimate contact with the AN in the LP and are therefore considered to be water stable fuels as they relate to the LP only. By oxygen deficient organic compounds we mean those which, in a blasting agent, require additional oxygen to complete their combustion.

Test compositions were made with a porous ammonium nitrate prill, reported by the manufacturer to contain 0.75% of an inorganic parting agent and .5% to 1% of an inert coating. Other additional materials used such as waxes, mononitrotoluenes, ethylene glycol, fuel oil, sodium and calcium nitrates, plasticizers and gelling agents were all readily available commercial products of standard specifications.

Alkali and alkaline metal earth nitrates for example, SN and CN may be substituted for a portion of the AN as indicated by the following tables when it is desired to alter the plasticity and/or density of the compound.

Velocity of detonation (VOD) tests of the compositions were carried out in 12 inch lengths of 3″ diameter schedule 40 steel pipe, each having a 4″ by 4″ by ¼″ steel plate welded to the bottom end. The bombs were loaded and shot in the upright position with the priming charge taped to the top end. A 3″ diameter by 4″ high 750 gram charge of 75% high velocity gelatin dynamite served as a primary to detonate the test compositions. The Dautriche method of velocity measurement was used throughout. Velocity leads were inserted in ¼″ holes on 6″ centers at 3″ and 9″ respectively from the top end of the bomb.

In addition to VOD the density of each test composition was found by weighing each bomb to the nearest gram. Cutting, deforming and pitting effects were carefully observed on the remanants on the bottom of the plates after detonation. These later observations give a relative measure of the brisance of the detonation. Results of the most significant and illustrative tests are given herein to facilitate understanding of the invention.

The wide variation permissible in both chemical composition and water content of these formulations where said intimate contact of the stable fuel with the AN in the SP and LP is retained, is clearly seen in Table I test results using the various formulae as indicated in tests of the same number listed in Table I formulae.

Attention is directed to the fact that successful tests were conducted having water contents varying from 3.17% to 33.3% by weight, the latter containing all of the fuel in suspension and having no solid phase. To maintain suitable liquid consistency in the formulae of the first three tests; that is S182, S145 and S119, the water content was adjusted to accommodate the increased solubility of the double salt systems used. Where the water content proportion is sufficient to effect the desired plasticity, a gelling agent or water thickening agent is not essential.

TABLE I.—FORMULAE

| Test No. | Percent | | | | | | | |
|---|---|---|---|---|---|---|---|---|
| | $H_2O$ | AN | U | CN | SN | DFO | p-NT | c-OP |
| S-182 | 3.17 | 77.50 | 19.3 | | | | | |
| S-145 | 10.00 | 71.5 | | 10.00 | | | 8.00 | 0.50 |
| S-119 | 11.00 | 58.74 | | | 17.80 | 2.40 | 8.72 | 1.34 |
| S-124 | 17.4 | 73.3 | | | | | 8.1 | 1.2 |
| S-127 | 24.75 | 66.22 | | | | | 7.53 | 1.50 |
| S-131 | 33.33 | 52.01 | | | | | 13.33 | 1.33 |

TABLE I.—TEST RESULTS

| | Overall Ox. Bal. | VOD, ft./sec. | Density, gms./cc. | Percent Water content |
|---|---|---|---|---|
| S-182 | +0.06 | 7581 | 1.21 | 3.17 |
| S-145 | +3.44 | 9262 | 1.31 | 10.00 |
| S-119 | -6.28 | 6780 | 1.36 | 11.00 |
| S-124 | -1.36 | 9219 | 1.29 | 17.40 |
| S-127 | -2.16 | 6220 | 1.26 | 24.75 |
| S-131 | -15.28 | 7216 | 1.28 | 33.33 |

Table II shows a series of four test shots S175 through S178, designed to establish the effect of variations from overall oxygen balance on VOD.

The variations in oxygen balance were accomplished by mixing AN and melted DFO-EVA to result in a negative oxygen balance in the SP, and then adding to it a saturated AN-water solution for the LP. The oxygen balance of the SP could not change since no additional AN could dissolve from the SP mixture into the already saturated LP. The liquid phase therefore contained only AN, water and c-OP retained a constant oxygen balance of +4.42.

Examination of the Table II and comparison of the formulae will definitely establish the relationship of VOD and oxygen balance in the blasting agent compositions constituting the subject matter of this present application.

TABLE II.—FORMULAE

| | Percent | | | | |
|---|---|---|---|---|---|
| | H₂O | AN | DFO | EVA | c-OP |
| S-175 | 13.64 | 77.95 | 6.18 | 1.55 | 0.68 |
| S-176 | 13.64 | 78.95 | 5.38 | 1.35 | 0.68 |
| S-177 | 13.64 | 79.95 | 4.58 | 1.15 | 0.68 |
| S-178 | 13.64 | 80.95 | 3.78 | 0.95 | 0.68 |

TABLE II.—TEST RESULTS AND OXYGEN BALANCE

| | Oxygen balance | | | VOD, ft./sec. | Density, gms./cc. |
|---|---|---|---|---|---|
| | Solid phase | Liquid phase | Overall | | |
| S-175 | -16.39 | +4.42 | -11.39 | 6246 | 1.32 |
| S-176 | -12.73 | +4.42 | -8.31 | 8148 | 1.33 |
| S-177 | -9.07 | +4.42 | -4.65 | 9416 | 1.29 |
| S-178 | -5.41 | +4.42 | -0.99 | 9751 | 1.26 |

Table III illustrates a series of test shots which established that further increases were made in VOD and brisance of identical overall oxygen balance compositions by adjusting the internal oxygen balance between the SP and LP. It is seen that the more nearly ideal oxygen balance was approached, the higher was the VOD obtained. These adjustments were made by first adding all of the melted p-NT fuel to the solid phase AN, less the complementary amount of AN to be used in the LP. One of the three LP solutions was then added. In S-188 a fully saturated solution; in S-189 a ½ saturated solution, and in S-190 plain tap water. When mixed, the SP and LP of S-188 remained unchanged as the LP was already saturated; S-189 dissolved enough of the AN for the SP to saturate the LP and at the same time liberating the p-NT, coating this quantity of AN, into a finely divided form suspended in the LP. S-190 dissolved a still larger amount of the SP AN to make the LP a saturated solution and distributed proportionately more of the p-NT coating in a finely divided form in the LP.

The distribution of ingredients in the SP and LP of the mixtures after they had been mixed and reached equilibrium, is shown in TABLE III formulae.

TABLE III.—FORMULAE

| | Solid phase ingredients (percent) | | | Liquid phase ingredients (percent) | | |
|---|---|---|---|---|---|---|
| Test No. | AN | p-NT | H₂O | AN | p-NT | c-OP |
| S-188 | 48.00 | 8.00 | 15.00 | 28.50 | 0.00 | 0.50 |
| S-189 | 48.00 | 6.18 | 15.00 | 28.50 | 1.82 | 0.50 |
| S-190 | 48.00 | 5.02 | 15.00 | 28.50 | 2.98 | 0.50 |

TABLE III.—OXYGEN BALANCE AND TEST RESULTS

| | Oxygen balance | | | VOD, ft./sec. | Density, gms./cc. |
|---|---|---|---|---|---|
| | SP | LP | Overall | | |
| S-188 | -4.86 | +5.11 | +0.25 | 9,316 | 1.18 |
| S-189 | -1.57 | +1.82 | +0.25 | 10,931 | 1.25 |
| S-190 | +0.52 | -0.27 | +0.25 | 11,152 | 1.27 |

This was further investigated using paraffin was as the SP fuel and para-nitrotoluene as the LP fuel in the mixtures. For more precise control, the two phases were made up separately in each of the test compositions. They were then mixed together to get the exact distribution of ingredients shown in Table IV formulae.

TABLE IV.—FORMULAE

| | Solid phase ingredients (percent) | | Liquid phase ingredients (percent) | | | |
|---|---|---|---|---|---|---|
| Test No. | AN | PW | H₂O | AN | p-NT | PW | c-OP |
| S204 | 51.55 | 4.45 | 15.00 | 28.50 | | | 0.50 |
| S205 | 51.50 | 3.90 | 15.00 | 28.50 | 1.00 | | 0.50 |
| S206 | 50.65 | 3.35 | 15.00 | 28.50 | 2.00 | | 0.50 |
| S207 | 50.20 | 2.80 | 15.00 | 28.50 | 3.00 | | 0.50 |
| S208 | 51.55 | 2.87 | 15.00 | 28.50 | | 1.58 | 0.50 |

TABLE IV.—OXYGEN BALANCE AND TEST RESULTS

| | Oxygen Balance | | | VOD, ft./sec. | Density, gms./cc. | Percent p-NT in LP |
|---|---|---|---|---|---|---|
| Test No. | SP | LP | Overall | | | |
| S204 | -5.09 | +5.11 | +0.02 | 10,036 | 1.24 | 0 |
| S205 | -3.27 | +3.30 | +0.03 | 10,489 | 1.28 | 1 |
| S206 | -1.46 | +1.49 | +0.03 | 11,265 | 1.27 | 2 |
| S207 | +0.35 | -0.31 | -0.04 | 10,850 | 1.27 | 3 |
| S208 | -0.01 | +0.01 | +0.02 | 11,500 | 1.20 | 0 |

Attention is directed particularly to the VOD comparison of S204 and S208 where identical compositions were employed. However, due to the method of make up, there was no PW fuel in the LP of 204, and both the SP and LP were therefore separately unbalanced. On the other hand, 208, again due to the method of make up, contained the correct stoichiometric amount of PW fuel in both phases and was therefore internally oxygen balanced. The considerable difference in VOD is due to this adjustment of the internal oxygen balance between the SP and the LP.

Additional tests were carried out using various fuels and combinations of fuels. Of interest are the following two test mixes shown in the Table V in which ethylene glycol and c-OP are the only fuels used in the liquid phase.

TABLE V.—FORMULAE

| | Percent | | | | | |
|---|---|---|---|---|---|---|
| | H₂O | AN | p-NT | PW | EG | c-OP |
| S-210 | 13.40 | 76.92 | 5.63 | | 3.55 | 0.50 |
| S-211 | 13.40 | 79.45 | | 3.08 | 3.57 | 0.50 |

| | Oxygen Balance | | | VOD, ft./sec. | Density, gms./cc. |
|---|---|---|---|---|---|
| | SP | LP | Overall | | |
| S-210 | -0.10 | -0.07 | -0.03 | 10,958 | 1.30 |
| S-211 | -0.02 | -0.01 | -0.03 | 11,903 | 1.27 |

| | Comparative Data | | | VOD, ft./sec. | Density, gms./cc. |
|---|---|---|---|---|---|
| | AN | DFO | Overall | | |
| S-91 | 94.59 | 5.41 | -0.01 | 12,066 | 0.895 |
| S-154 | 94.59 | 5.41 | -0.01 | 11,323 | 0.890 |

In these compositions it was necessary to reduce the water component in the liquid mixture in order to maintain the proper consistency and the overall liquid content at the same equivalent volume. As a basis for comparison, included is a table showing shot tests S-91 and S-154 which employed the standard AN diesel fuel oil (DFO) blasting agents in which porous AN prills from the same manufacturer from two separate lots were shot under identical conditions with the S210 and S211 tests.

The ingredient costs in the standard ANFO used in S91 and S154 in this market area, calculate to $3.80 per hundred weight. For a comparative basis, S211, produced according to the present disclosure and having a VOD intermediate to that of S91 and S154, cost $3.96 per hundred weight. S208 having a VOD intermediate to S91 and S154 cost $3.76 per hundred weight. When it is understood that the conventional ANFO mixtures have heretofore been the lowest cost blasting agents available, it will be seen that we have provided a desirable blasting agent in the slurry class which is comparable in cost to that of the conventional ANFO blasting agents. One of the highest velocity compositions is actually of less cost than for ANFO while the others approach the low cost of ANFO. Many additional less expensive formulations can be readily extropolated from the foregoing data and remain only to be tested.

As these new compositions are blasting agents, they are not cap sensitive. Being less sensitive than ANFO they require some degree of confinement for the most efficient detonation. As with all blasting agents, high strength, high velocity, gelatin dynamite or cast primers are recommended. Minor changes in the basic formulations such as in the type of stable fuel, different WR flours and gelling agents, the use of cross linking, metalizing and other such variations, obvious to one skilled in the art, are contemplated and are included by intent in the scope of this disclosure.

Having thus described our invention, we desire to secure by Letters Patent of the United States the following:

1. A blasting agent composition having at least a liquid phase and consisting essentially of in weight proportions:
   between about 50% and 81% of a nitrate component, said nitrate component being not less than 45% of ammonium nitrate based on the total composition and any balance of said nitrate component being selected from the group consisting of alkali metal nitrates, alkaline earth metal nitrates, and combinations thereof;
   from about 2.5% to about 18% water stable normally solid non-explosive liquifiable carbonaceous fuel intimately associated physically with said nitrate by mixing the liquified fuel and nitrate in particulate form;
   from about 5% to about 33.3% water; and
   from zero to enough water thickening agent to effect a desired consistency;
   said nitrate and fuel being in proportions to obtain an oxygen balance within detonatable limits in the final composition.

2. The composition according to claim 1 wherein:
   a measurable portion of said solid fuel is a water miscible organic liquid fuel in proportion to the nitrate in the liquid phase to maintain said oxygen balance.

3. The composition of claim 1 wherein the fuel is a wax which is solid under normal temperatures and pressures.

4. The composition of claim 2 wherein the water miscible organic liquid fuel is ethylene glycol.

5. The composition of claim 1 wherein the fuel is selected from the group of: solid hydrocarbons, solid nitroaromatic compounds, each being of a consistency at least equal to a solid wax at normal temperatures and pressures.

6. The composition of claim 4 wherein the solid fuel is selected from the group of: solid hydrocarbons, solid nitroaromatic compounds, each being of a consistency at least equal to a solid wax at normal temperatures and pressures.

7. The composition of claim 1 wherein the nitrate component is selected from porous prills, agricultural prills, crystalline, flake, grained and mixtures thereof.

8. The composition of claim 2 wherein the nitrate component is selected from porous prills, agricultural prills, crystalline, flake, grained and mixtures thereof.

9. The composition of claim 1 wherein the oxygen balance is within about + and — 5%.

10. The composition of claim 1 wherein the selected nitrate and fuel have additionally a solid phase and the oxygen balance in each phase is within about + and — 10% and said phases together have an oxygen balance of within about + and — 5%.

11. The composition of claim 1 wherein the ammonium nitrate is in the form of porous prills; and
   the solid fuel is paraffin wax, brought into intimate association with said porous prills by mixing the melted wax and prills said prills being at a temperature above the melting point of said wax.

12. The composition of claim 2 wherein the ammonium nitrate is in the form of porous prills; and
   the solid fuel is paraffin wax, brought into intimate association with said porous prills by mixing the melted wax and prills said prills being at a temperature above the melting point of said wax.

13. The composition of claim 4 wherein the ammonium nitrate is in the form of porous prills; and
   the solid fuel is paraffin wax, brought into intimate association with said porous prills by mixing the melted wax and prills said prills being at a temperature above the melting point of said wax.

14. The composition of claim 1 wherein the ammonium nitrate is in the form of porous prills; and
   the solid fuel is para-nitrotoluene, brought into intimate association with said porous prills by mixing the melted fuel and prills said prills being at a temperature above the melting point of said fuel.

15. The composition of claim 2 wherein the ammonium nitrate is in the form of porous prills; and
   the solid fuel is para-nitrotoluene, brought into intimate association with said porous prills by mixing the melted fuel and prills said prills being at a temperature above the melting point of said fuel.

16. The composition of claim 4 wherein the ammonium nitrate is in the form of porous prills; and
   the solid fuel is para-nitrotoluene, brought into intimate association with said porous prills by mixing the melted fuel and prills said prills being at a temperature above the melting point of said fuel.

17. A method for making a plastic blasting agent which comprises:
   agitating together a particulate nitrate component and water stable normally solid melted fuel in predetermined proportions while maintaining the mixture at a temperature wherein said fuel is fluid and for a sufficient period of time to effect an intimate mixture thereof, said nitrate component being not less than 45% of ammonium nitrate based on the total composition and any balance of said nitrate component being selected from the group consisting of alkali metal nitrates, alkaline earth metal nitrates, and combinations thereof;
   combining said mixture and water with or without a water thickening agent while continuing said agitation to effect a plastic mass of desired consistency.

18. The method of claim 17 and further characterized by maintaining the temperature of the mixture at 90°–95° F. and adding the water at about 120° F. during agitation thereof.

19. The method of claim 18 and further characterized by maintaining the mixture with a water thickening agent at about 115° F. while combining and intermixing the same and the resultant mixture and the said water at about 70° F. while combining and intermixing them to effect said plastic mass.

(References on following page)

References Cited

UNITED STATES PATENTS

| | | | |
|---|---|---|---|
| 3,103,457 | 9/1963 | Grossmann | 149—46 |
| 3,111,437 | 11/1963 | Hino et al. | 149—46 |
| 3,150,019 | 9/1964 | Logan et al. | 149—46 X |
| 3,161,551 | 12/1964 | Egly et al. | 149—46 |
| 3,166,450 | 1/1965 | Kaufman | 149—46 |
| 3,180,768 | 4/1965 | Scott | 149—46 X |
| 3,212,944 | 10/1965 | Lyon et al. | 149—46 X |
| 3,240,641 | 3/1966 | Wilson | 149—46 |
| 3,279,965 | 10/1966 | Brancion | 149—46 |
| 3,305,414 | 2/1967 | Hodgson | 149—46 |
| 3,244,568 | 4/1966 | Campbell | 149—46 |

CARL D. QUARFORTH, *Primary Examiner.*

S. J. LECHERT, *Assistant Examiner.*

U.S. Cl. X.R

149—46, 55, 56, 57, 60, 61, 67, 69